Dec. 29, 1959  G. E. KAUTZ  2,919,068
THERMOSTATICALLY CONTROLLED OUTLET BOX
Filed Oct. 16, 1956  3 Sheets-Sheet 1
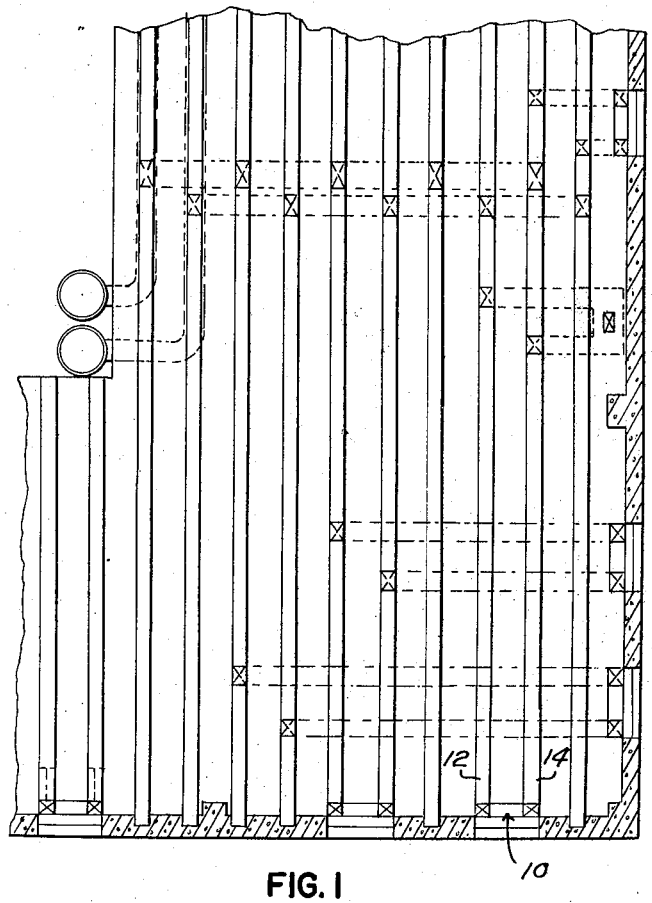
FIG. I
INVENTOR.
Glenn E. Kautz
BY Robert R. Churchill
ATTORNEY Dec. 29, 1959  G. E. KAUTZ  2,919,068
THERMOSTATICALLY CONTROLLED OUTLET BOX
Filed Oct. 16, 1956  3 Sheets-Sheet 2

INVENTOR.
Glenn E. Kautz
BY Robert R. Churchill
ATTORNEY

Dec. 29, 1959　　　　　G. E. KAUTZ　　　　　2,919,068
THERMOSTATICALLY CONTROLLED OUTLET BOX
Filed Oct. 16, 1956　　　　　　　　　　　3 Sheets-Sheet 3

INVENTOR.
Glenn E. Kautz
BY Robert R. Churchill
ATTORNEY ated Dec. 29, 1959

2,919,068

THERMOSTATICALLY CONTROLLED OUTLET BOX

Glenn E. Kautz, Sewickley, Pa., assignor to H. H. Robertson Company, Pittsburgh, Pa., a corporation of Pennsylvania Application October 16, 1956, Serial No. 616,265

2 Claims. (Cl. 236—13)

This invention relates to a thermostatically controlled outlet box for an air conditioning system.

The object of the invention is to provide a novel thermostatically controlled outlet box having the thermostat mounted on the box and wherein provision is made for causing a stream of air from within the building to flow over the heat responsive element of the thermostat to the end that the thermostat may accurately respond to air conditions in the portion of the building within which the outlet box is located.

With this general object in view and such others as may hereinafter appear the invention consists in the thermostatically controlled outlet box for an air conditioning system hereinafter described and particularly defined in the claims at the end of this specification.

In the drawings illustrating the preferred embodiment of the invention:

Fig. 1 is a plan of a portion of a building and air conditioning structure of the type illustrated in the Goemann patent, No. 2,729,429, dated January 3, 1956, and embodying the present outlet boxes;

Figure 3:
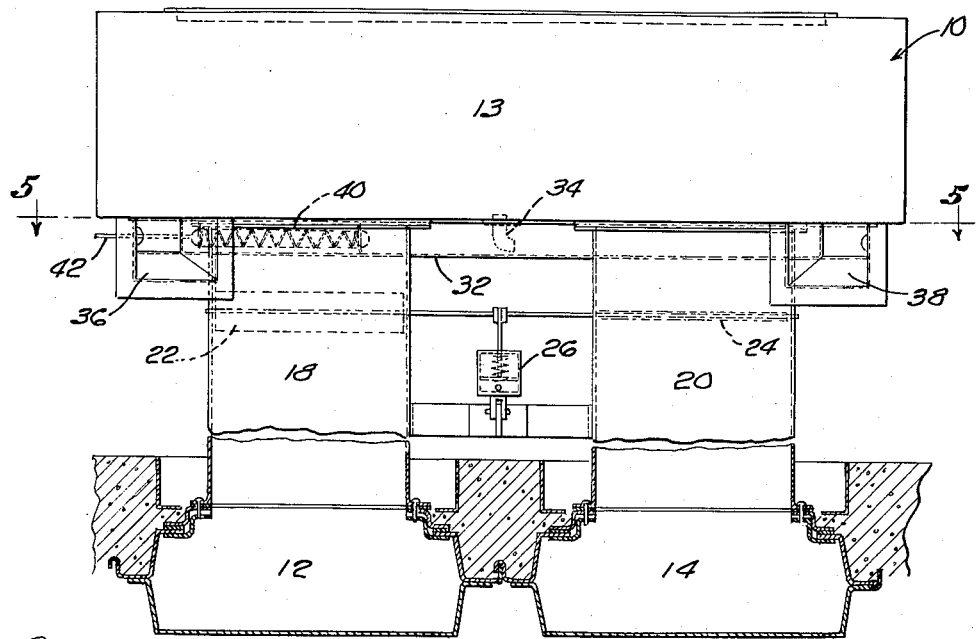
Fig. 3 is a front elevation with portions in section of the outlet box shown in Fig. 2.
Figure 2:
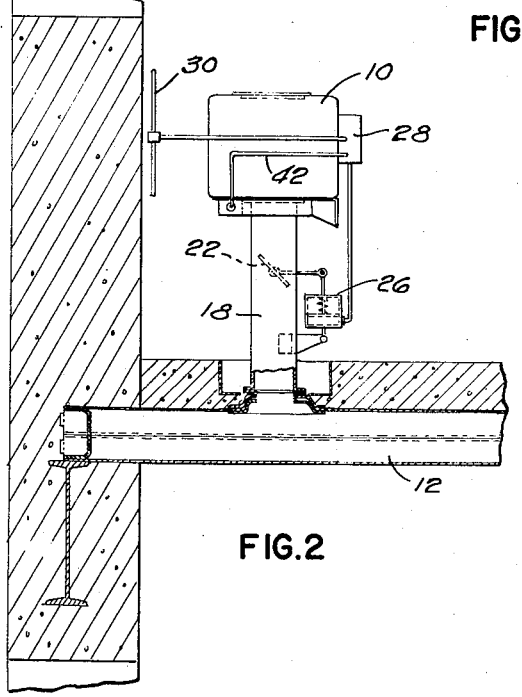
Fig. 2 is an end elevation with portions in section showing the present outlet box in operative position.
Figure 4:
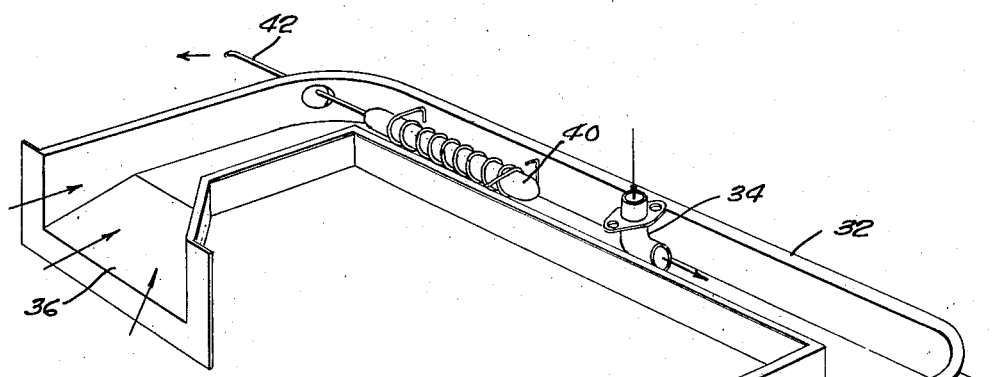
Fig. 4 is a perspective view of the separate conduit showing the heat responsive element of the thermostat mounted thereon and over which the air from within the building is caused to flow.
Figure 5:
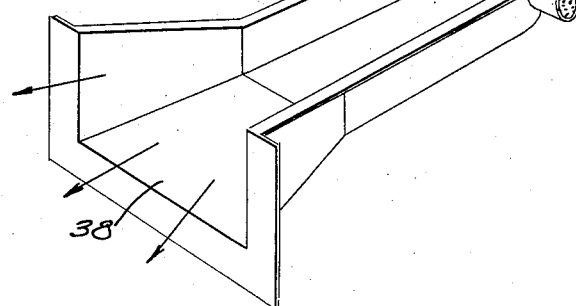
Fig. 5 is a sectional view taken on the line 5—5 of Fig. 3 viewed in the direction of the arrows.

The present invention contemplates a construction of outlet box for an air conditioning system and preferably for a dual duct air conditioning system, such as that illustrated in the Goemann patent above referred to. The present outlet box is provided with a mixing chamber into which separate air streams of different condition are led from sources of supply, such as the air conducting floor cells of the Goemann patent, through separate conduits. The latter are provided with dampers controlling the air flow and the dampers are controlled in their operation by thermostatic means. Provision is made in accordance with the present invention for mounting the thermostatic means upon the outlet box and for causing air to flow from within the portion of the building within which the outlet box is located over the heat responsive element of the thermostat.

Referring now to the drawings, the outlet or sill box is indicated generally at 10 and is adapted for use in an air distributing system of the type as shown in the Goemann Patent No. 2,729,429 wherein each outlet or sill box 10 is in communication with hot and cold air conducting cells 12, 14 forming a part of the flooring structure as indicated in Fig. 1. The sill box 10 is provided with a mixing chamber 13, and air of different condition, usually hot and cold air, flows into the mixing chamber through a pair of stacks 18, 20 connected to the hot and cold air conducting cells 12, 14 respectively, and the stacks are provided with dampers 22, 24. One damper 22 is arranged at right angles to the other damper 24 for winter heating operation. The dampers are arranged to be rotated to control the hot and cold air flow by connections to an air cylinder 26 actuated by a thermostat 28 connected in a compressed air supply line 30, the thermostat acting as a valve to increase the air pressure to the cylinder upon an increase in room temperature. In practice an increase in room temperature will effect opening of the cold air damper and closing of the hot air damper and vice versa. For summer cooling operation both cells 12, 14 may be used to supply cold air to the mixing chamber, and for such purpose the relative positions of the dampers may be changed by any known or suitable means so that the dampers are parallel to each other.

The present invention is directed particularly to an outlet box wherein the thermostatic means for controlling the operation of the dampers is mounted on the outlet box, and wherein an aspirating device for inducing room air to flow over the heat responsive element of the thermostatic means is provided. Such a structure is particularly adapted for use where the thermostat is mounted in or on the sill box itself rather than at a remote location on the wall so that the damper operation may respond to average temperature conditions of the air in the room in the vicinity of the outlet box.

As herein shown, the aspirating device consists in a guideway or channel 32 open at the top which is U-shaped in cross section and also U-shaped in plan view, the end of the duct being bell-mouthed or flared outwardly as shown. The duct member 32 may be fitted on the underside of the sill box with the flared ends flush with the front of the sill box, as shown, the underside of the sill box forming with the U-shaped channel an enclosed duct open at both ends. At the middle of the long run of the duct member 32 a hole is drilled upwardly into the interior chamber of the mixing box 10, and a jet elbow 34 is mounted therein with the delivery end of the jet facing in the direction the flow is to be induced in the conduit 32. In practice the inlet and outlet openings 36, 38 respectively of the aspirator channel may be provided with grilles or louvered openings. The temperature sensing bulb element 40 is supported on a spiral spring structure within the channel on the upstream side of the jet elbow 34. The jet power is furnished by the air escaping through the jet elbow from the mixing box which would always be at a pressure level about 0.1" W.G. above atmospheric pressure. Thus, the room air will be induced to flow into the inlet 36 and over the temperature sensing bulb element 40 to be exhausted through the outlet 38. A tube connection 42 from the bulb element leads to the thermostat 28 mounted on the sill box which controls the damper setting in accordance with the room temperature as described. In practice the aspirator channel may comprise sheet metal or preferably may be molded of insulating material.

While the preferred embodiment of the invention has been herein illustrated and described, it will be understood that the invention may be embodied in other forms within the scope of the following claims.

Having thus described the invention, what is claimed is:

1. An outlet box for an air conditioning system in a building comprising a box providing a mixing chamber and having a discharge outlet in the upper wall thereof, two air supply conduits leading into the lower wall of the box and through which hot and cold air respectively flow to be mixed in the mixing chamber, dampers in each conduit for controlling the air flow therethrough, thermostatic means including a thermostat and a heat responsive element for controlling the operation of the dampers, means mounting the thermostatic means on the outlet box, and means mounted on the outlet box for causing a stream of air from within the building to flow over the heat responsive element of the thermostat including a separate conduit mounted on the underside of the outlet box and forming with the lower wall thereof a passageway having an inlet and an outlet extending around the hot and cold air conduits, an aspirator nozzle intermediate said inlet and outlet and directed toward the outlet, said nozzle being connected to the lower wall of the outlet box to cause air to flow from the mixing chamber through the nozzle to thereby induce room air flow through the passageway, said heat responsive element being mounted in the passageway between the inlet and said nozzle to be exposed to the flow of air from within the building through said passageway.

2. An outlet box as defined in claim 1 wherein the separate conduit comprises an insulating material to reduce to a minimum heat conductivity from the outlet box to the passageway.

References Cited in the file of this patent

UNITED STATES PATENTS

| | | |
|---|---|---|
| 922,783 | Korting | May 25, 1909 |
| 1,176,536 | Fulton | Mar. 21, 1916 |
| 1,770,765 | Bulkeley | July 15, 1930 |
| 2,316,619 | Raney | Apr. 13, 1943 |
| 2,620,983 | Lyman | Dec. 9, 1952 |
| 2,720,151 | Kreuttner | Oct. 11, 1955 |

FOREIGN PATENTS

| | | |
|---|---|---|
| 163,906 | Australia | July 5, 1955 |